United States Patent [19]

Cuddihy et al.

[11] 4,134,881

[45] Jan. 16, 1979

[54] HIGH PERFORMANCE POLYESTER RESIN

[75] Inventors: Robert W. Cuddihy, Fridley, Minn.; Daniel S. Knoebel, Glenwood City, Wis.

[73] Assignee: Cargill, Incorporated, Minneapolis, Minn.

[21] Appl. No.: 822,100

[22] Filed: Aug. 5, 1977

[51] Int. Cl.$^2$ .................................................. C08L 67/06
[52] U.S. Cl. ....................................... 528/299; 528/304
[58] Field of Search ........................... 260/75 H, 75 UA

[56] References Cited

U.S. PATENT DOCUMENTS

| | | | |
|---|---|---|---|
| 3,933,939 | 1/1976 | Isozaki et al. | 260/75 UA |
| 3,937,756 | 2/1976 | Klein et al. | 260/75 H |
| 3,957,906 | 5/1976 | Buzbee et al. | 260/75 UA |

*Primary Examiner*—M. J. Welsh
*Attorney, Agent, or Firm*—Fitch, Even, Tabin & Luedeka

[57] ABSTRACT

Polyester polymers consisting essentially of ester condensation products of specific proportions of propylene glycol, adipic and fumaric acids, isophthalic acid and halogenated phthalic anhydride, and cured resins containing such polymers. The polymers are particularly useful in high performance matrices for fiber composites requiring properties including a combination of high heat deflection temperature and high tensile elongation.

3 Claims, No Drawings

HIGH PERFORMANCE POLYESTER RESIN

The present invention is directed to resin compositions and, more particularly, is directed to particular unsaturated polyester resin systems having a specific combination of properties particularly adapted for use in structural, reinforced composites.

The term "resin" is conventionally employed in connection with synthetic condensation polymers which in cured form are characterized by a high degree of crosslinking. Polyester resins which have been rendered insoluble and infusible by crosslinking are commercially important types of polymeric materials, and are conventionally used in casting, laminating, filament winding or other such applications in which the finished resin is cured in place. Unsaturated polyesters are conventionally prepared in linear or slightly branched molecular configuration by esterification of a glycol with an unsaturated acid component such as maleic anhydride or fumaric acid. The resulting polyester is mixed with a vinyl monomer such as styrene, and the unsaturated double bonds in the polyester provided by the unsaturated acid component are used as sites for copolymerization with the vinyl monomer. The resulting crosslinked polymers are relatively complex in chemical structure and are a combination of condensation and vinyl addition polymer products. The possible combinations of unsaturated polyesters are very large, and copolyesters of various diols or mixtures thereof with various mixtures of saturated and unsaturated acids are conventionally employed to provide a relatively wide range of properties when cured with a particular vinyl monomer.

One conventional use for crosslinked resin systems is the manufacture of fiber reinforced composites such as filament-wound structures, in which glass fibers substantially stronger than the resin are embedded in a matrix of the resin. The resin matrix protects the fibers and distributes applied stresses to the fibers.

Styrene-polyester resin matrices are generally substantially less expensive than, for example, epoxy resin matrices for fiber reinforced composites. However, one limitation with respect to structural styrene-polyester resin matrices for use in fiber reinforced composites is the difficulty of providing the resin with a combination of physical properties relating to composite performance including relatively high strength, high heat deflection temperature, high tensile elongation, and high modulus. A reinforced composite should also not present a fire hazard and in this regard the chemical composition of the resin should be such as to retard combustion of the composite. Providing such a combination of properties in a cross-linked polyester-styrene resin system in an economical manner places conflicting demands on the system. In this connection, for example, the heat deflection temperature and the tensile elongation are two conflicting properties which should each be maximized in a structural polyester resin for various high performance applications. However, a combination of relatively high heat deflection temperature and relatively high tensile elongation, particularly in combination with high strength and modulus characteristics, is difficult to obtain because heat deflection is related to resin rigidity while tensile elongation is related to resin resiliency. A requirement for incorporation of fire retardant properties in the polyester resin also may tend to result in conflicting demands with respect to physical properties.

Accordingly, it is an object of the present invention to provide an unsaturated polyester resin which is capable of providing a combination of relatively high strength, high modulus, high elongation and high heat deflection temperature when cured with a vinyl monomer. It is a further object to provide such a styrenated-polyester resin having such properties and which contributes fire retardant properties in reinforced composites. These and other objects will become apparent from consideration of the following detailed description.

Generally, the present invention is directed to a polyester resin consisting essentially of the condensation product of propylene glycol and a specific acid component, with the propylene glycol component being present in a slight molar excess (e.g., 7–12%) over the acid component. The acid component is a specific mixture of various organic acids, and in this connection the acid component of the polyester resins of the present invention consist essentially of fumaric acid, adipic acid, isophthalic acid, and halogenated phthalic anhydrides such as tetrachlorophthalic anhydride and tetrabromophthalic anhydride. It should be noted that while the propylene glycol and the indicated organic acids are referred to as being polyester resin components, it will be appreciated by those skilled in the art that with the general exception of polymer end groups, carboxylic acid groups and hydroxy groups are not present in the polyester resin, but rather the acid and glycol components are present in esterified form. Similarly, it will be appreciated that when organic acids are referred to in connection with the preparation and composition of unsaturated polyester resin materials, that the corresponding acid anhydrides may be equivalent materials for purposes of discussion and disclosure. The proportion of the halogenated phthalic anhydride component is selected to provide from about 5 to about 6 weight percent of halogen in the polyester, based on the total weight of the polyester resin composition, and this amount of halogen incorporated into the resin will provide a desirable degree of fire retardancy to the resin without disproportionately adversely affecting other properties of the resin.

The proportions of the various components of the polyester polymer are important. In this connection, considering the fumaric acid and the adipic acid to be aliphatic acid components, and the isophthalic acid and halogenated phthalic anhydride to be aromatic acid components, the molar ratio of the aromatic acid components to the aliphatic acid components should be in the range of from about 35/65 to about 37/68. Furthermore, the proportions of the aliphatic acid components are important and in this regard, the molar ratio of the adipic acid component to the fumaric acid component should be in the range of from about 20/45 to about 20/48.

The proportions of the aromatic acid components are also important, and as indicated hereinabove, the proportion of the halogenated phthalic anhydride component will be selected to provide from about 5 to about 7 percent by weight of halogen in the polyester polymer composition, principally for purposes of fire retardancy. The remaining aromatic isophthalic acid component contributes chemical resistance to the cured polyester resin composition. As also indicated hereinabove, the glycol components should be in slight excess over the acid components (e.g., 7–12%), and the acid number of the polyester should best be less than about 17 and preferably less than about 15. The acid number will desirably be in the range of from about 13 to 17. The acid components should be relatively evenly distributed in the molecular chain.

The polyester resins of the present invention are particularly adapted for use with styrene monomer to provide, upon being subjected to addition polymerization conditions, a cured styrene-polyester polymer having a particular combination of properties. The addition polymerization conditions may be provided in any conventional manner, such as by free-radical catalysts, ultraviolet light polymerization inducing systems, and electron bombardment. Prior to curing, the styrene monomer and the polyester polymer will be mixed to provide a solution of the polyester in the styrene monomer which generally should have a suitable viscosity for the intended use. For filament winding purposes, the styrene-polyester solution should best have a viscosity of from about 500 cps to about 800 cps at, for example, at a temperature of about 23–27° C. A solution of from about 62 to about 64 percent by weight of the polyester resin dissolved in styrene monomer, based on the weight of the solution, will provide a solution having an appropriate viscosity for filament winding purposes and having an appropriate composition for the end product, cured resin.

In connection with the particular combination of properties provided in accordance with the present invention, the matrix resin is further defined by the following specifications for a cured resin comprising 63 percent by weight of polyester resin and 37 percent styrene:

| CURED RESIN PROPERTIES | | |
|---|---|---|
| Property | Test Method | Value |
| Barcol Hardness | ASTM D-2583-72 | 40 Minimum |
| Heat Deflection Temperature | ASTM D-648-72 (264 psi stress) | 90° C Minimum |
| Flexural Strength* | ASTM D-790-71 | 20,000 psi Minimum |
| Flexural Modulus* | ASTM D-790-71 | $5.0 \times 10^5$ psi Minimum |
| Tensile Strength* | ASTM D-638-72 | 10,000 psi Minimum |
| Tensile Modulus* | ASTM D-638-72 | $5.0 \times 10^5$ psi Minimum |
| Tensile Elongation | ASTM D-638-72 | 3.0% Minimum |

*⅛" Clear casting tested at room temperature 24 hours after cure at 70° C for 2 hours, 121° C for 2 hours.

The polyester resins of the present invention may be produced through the use of a conventional two-stage unsaturated polyester polycondensation reaction. In this regard, the isophthalic acid and propylene glycol components are initially charged to a reactor. The acid and glycol are then heated under polyesterification conditions until the esterification reaction is substantially completed, for example, as represented by a relatively low acid value of less than about 5. The reaction products are relatively short chain polymers or oligomers which are made up of alternating units of isophthalic acid and propylene glycol, and which are generally end capped by the glycol. The resulting liquid is cooled, and the fumaric acid, adipic acid and halogenated phthalic anhydride components charged to the reactor for a second stage of the condensation reaction in which the remaining hydroxy groups are esterified and in which some transesterification may take place, until the reaction is again substantially complete, for example, as represented by an acid value of from about 13 to about 17. The resulting polyester plastic may then be cooled and mixed with a desired amount of inhibited styrene monomer to yield a prepolymer resin solution.

The following Examples illustrate various aspects of the present invention.

EXAMPLE I

A polyester composition of the present invention utilizing tetrachlorophthalic anhydride as the halogenated aromatic acid component is prepared having the following composition.

| | % by Weight of Reactor Charge | Moles |
|---|---|---|
| Isophthalic Acid | 15.90 | 0.23 |
| Fumaric Acid | 21.88 | 0.45 |
| Adipic Acid | 12.31 | 0.20 |
| Tetrachlorophthalic Anhydride | 14.36 | 0.12 |
| Propylene Glycol | 35.55 | 1.12 |
| | 100.00 | |

The polyester resin is produced through the use of a conventional two-stage unsaturated polyester polycondensation reaction. The isophthalic acid and propylene glycol are charged to a reactor and heated under polyesterification conditions until an acid value of less than about 5 is reached. The resulting liquid is then cooled and the fumaric acid, adipic acid and halogenated phthalic anhydride are charged to the reactor for a second stage of the condensation reaction in which the components are heated to about 210° C. until an acid value of from about 13 to about 17 is obtained.

A commercial inhibited styrene monomer is mixed with the polyester thus prepared, to provide a 63% by weight non-volatiles solution. 1.0 gm of benzoyl peroxide catalyst is added to 100 gm of the mixture, which is cured in a mold at 70° C. for 2 hours, and subsequently at 121° C. for 2 hours. After 24 hours, a ⅛" clear casting of the polyester exhibits the following physical properties when tested in accordance with the indicated ASTM testing procedures:

| CURED RESIN PROPERTIES | | |
|---|---|---|
| Property | Test Method | Value |
| Barcol Hardness | ASTM D-2583-72 | 43 – 44 |
| Heat Deflection Temperature | ASTM D-648-72 (264 psi stress) | 90° C |
| Flexural Strength | ASTM D-790-71 | $21.1 \times 10^3$ psi |
| Flexural Modulus | ASTM D-790-71 | $5.32 \times 10^5$ psi |
| Tensile Strength | ASTM D-638-72 | $11.14 \times 10^3$ psi |
| Tensile Modulus | ASTM D-638-72 | $5.47 \times 10^5$ psi |
| Tensile Elongation | ASTM D-638-72 | 3.12% |

When employed as the matrix resin in glass fiber reinforced composites, including both uniaxial glass fiber composites and crossed fiber layer composites (e.g., ± 20°) fiber orientation composites, excellent composite properties are provided. The combination of properties of the resin matrix, including the high heat deflection and high tensile elongation combination, interact with the glass fibers to provide composites with outstanding properties.

EXAMPLE II

A polyester composition of the present invention utilizing tetrabromophthalic anhydride as the halogenated aromatic acid component is prepared having the following composition:

|                              | % by Weight of Reactor Charge | Moles |
|------------------------------|-------------------------------|-------|
| Isophthalic Acid             | 19.32                         | .28   |
| Fumaric Acid                 | 22.18                         | .46   |
| Adipic Acid                  | 12.14                         | .20   |
| Tetrabromophthalic Anhydride | 11.59                         | .06   |
| Propylene Glycol             | 34.77                         | 1.10  |
|                              | 100.00                        |       |

The polyester resin is produced through the use of a conventional two-stage unsaturated polyester polycondensation reaction. The isophthalic acid and propylene glycol are charged to a reactor and heated under polyesterification conditions until an acid value of less than about 5 is reached. The resulting liquid is then cooled and the fumaric acid, adipic acid and halogenated phthalic anhydride are charged to the reactor for a second stage of the condensation reaction in which the components are heated to about 210° C. until an acid value of from about 15 to about 20 is obtained.

A commercial inhibited styrene monomer is mixed with the polyester thus prepared, to provide a 63% by weight non-volatiles solution. 1.0 gm of benzoyl peroxide catalyst is added to 100 gm of the mixture, which is cured in a mold at 70° C. for 2 hours, and subsequently at 121° C. for 2 hours. After 24 hours, a ⅛" clear casting of the polyester exhibits the following physical properties when tested in accordance with the indicated ASTM testing procedures:

| CURED RESIN PROPERTIES | | |
|---|---|---|
| Property | Test Method | Value |
| Barcol Hardness | ASTM D-2583-72 | 44 – 45 |
| Heat Deflection Temperature | ASTM D-648-72 (264 psi stress) | 97.5 |
| Flexural Strength | ASTM D-790-71 | 21.6 × 10³ psi |
| Flexural Modulus | ASTM D-790-71 | 5.40 × 10⁵ psi |
| Tensile Strength | ASTM D-638-72 | 12.0 × 10³ psi |
| Tensile Modulus | ASTM D-638-72 | 5.67 × 10⁵ psi |
| Tensile Elongation | ASTM D-638-72 | 3.60 |

When employed as the matrix resin in glass fiber reinforced composite, excellent composite properties are provided. Such composites, and especially filament wound composites, have particular utility in high performance structural form, such as in load supporting railroad car body form.

EXAMPLE III

A series of polyesters is prepared to study the properties of polyesters containing a mixture of diol components. In this series of runs, the diols used are 2,2,4-trimethyl-1,3-pentanediol (hereinafter referred to as TMPD), neopentyl glycol (hereinafter referred to as NPG) and 1,6 hexanediol (hereinafter referred to as HD). The acid components used in these examples are maleic acid or fumaric acid, isophthalic acid, adipic acid, and tetrachlorophthalic anhydride.

The compositions of these polyesters, in which it is attempted to introduce increased tensile elongation through the use of various aliphatic alcohols, while providing high values of other physical properties, are as follows:

| Run No. | Maleic Anhydride | Fumaric Acid | Isophthalic Acid | Adipic Acid | Tetrachloro-Phthalic Anhydride | TMPD | NPG | H.D. |
|---|---|---|---|---|---|---|---|---|
| 1  | .50   | 0    | .45   | .375 | .25  | .894 | .894 | 0    |
| 2  | .60   | 0    | .40   | .50  | .25  | .965 | .965 | 0    |
| 3  | .50   | 0    | .45   | .05  | 0    | .565 | .565 | 0    |
| 4  | .60   | 0    | .35   | .05  | 0    | .565 | .565 | 0    |
| 5  | .50   | 0    | .335  | 0    | .165 | .53  | .53  | 0    |
| 6  | .50   | 0    | .285  | .05  | .165 | .53  | .53  | 0    |
| 7  | .50   | 0    | .45   | .05  | 0    | .53  | .53  | 0    |
| 8  | .50   | 0    | .50   | .063 | 0    | .593 | .593 | 0    |
| 9  | .50   | 0    | .50   | .068 | 0    | .564 | .564 | 0    |
| 10 | .50   | 0    | .50   | .10  | 0    | .53  | .53  | 0    |
| 11 | .376  | 0    | .376  | .083 | .165 | .53  | .53  | 0    |
| 12 | .376  | 0    | .376  | .083 | .165 | .265 | .53  | .265 |
| 13 | .376  | 0    | .376  | .083 | .165 | .53  | .265 | .265 |
| 14 | .376  | 0    | .376  | .083 | .165 | .353 | .353 | .353 |
| 15 | .310  | 0    | .465  | .075 | .150 | .353 | .353 | .353 |
| 16 | 0     | .676 | .489  | 0    | .165 | 0    | .705 | .705 |

The polyesters are mixed with styrene monomer to provide a solution of 62–64 weight percent of the polyester in the solution as in Example I, and are cured and tested in accordance with the procedures and ASTM test methods set forth in Example I to provide cured resins with the following properties:

| Run No. | Flexural Strength (×10³ psi) | Flexural Modulus (×10⁵ psi) | Tensile Strength (×10³ psi) | Tensile Modulus (×10⁵ psi) | Tensile Elongation (%) | Heat Deflection Temp (° C) | Barcol Hardness |
|---|---|---|---|---|---|---|---|
| 1  | 7.0  | 2.47 | 3.56  | 2.21 | >10  | 50  | 22 – 23 |
| 2  | 5.8  | 2.11 | 4.03  | 1.97 | >10  | 41  | 20 – 21 |
| 3  | 20.0 | 5.17 | 10.84 | 5.17 | 2.90 | 87  | 42 – 43 |
| 4  | 18.6 | 5.00 | 9.71  | 4.99 | 2.63 | 104 | 44 – 45 |
| 5  | 12.7 | 5.51 | 6.93  | 5.87 | 1.17 | 74  | 45 – 46 |
| 6  | 11.3 | 5.42 | 7.39  | 5.93 | 1.40 | 72  | 45 – 46 |
| 7  | 15.5 | 5.23 | 8.79  | 5.44 | 1.92 | 68  | 42 – 43 |
| 8  | 16.0 | 5.18 | 8.62  | 5.28 | 1.86 | 68  | 42 – 43 |
| 9  | 15.9 | 5.15 | 8.87  | 5.28 | 1.95 | 65  | 42 – 43 |
| 10 | 18.3 | 4.97 | 9.61  | 4.88 | 2.50 | 67  | 40 – 41 |
| 11 | 15.6 | 4.94 | 8.29  | 5.14 | 1.94 | 58  | 41 – 42 |
| 12 | 16.0 | 4.41 | 8.81  | 4.63 | 2.52 | 54  | 39 – 40 |
| 13 | 11.6 | 3.5  | 7.56  | 4.02 | 6.06 | 48  | 34 – 35 |
| 14 | 13.8 | 3.93 | 8.25  | 4.13 | 4.80 | 50  | 33 – 34 |
| 15 | 13.9 | 4.37 | 8.13  | 4.49 | 2.48 | 50  | 34 – 35 |

-continued

| Run No. | Flexural Strength (×10³ psi) | Flexural Modulus (×10⁵ psi) | Tensile Strength (×10³ psi) | Tensile Modulus (×10⁵ psi) | Tensile Elongation (%) | Heat Deflection Temp (° C) | Barcol Hardness |
|---|---|---|---|---|---|---|---|
| 16 | 18.9 | 4.94 | 11.93 | 4.94 | 3.64 | 72 | 44 – 45 |

Only run No. 3 has a flexural strength of at least 20,000 psi, and this resin does not have a heat deflection temperature of at least 90° C. or a tensile elongation of at least 3 percent.

EXAMPLE IV

A series of polyesters is prepared to study the properties of polyester resins which include propylene glycol (PG) and 1,6 hexanediol (HD) in the polyester chain. These polyester compositions, like those of Example III, represent an unsuccessful attempt to provide a specified level of increased tensile elongation through the use of a specific, longer-chain aliphatic alcohol component (HD) while maintaining a specified level of high values of other physical properties. The composition of these polyesters are as follows:

| Run No. | Maleic Anhydride | Fumaric Acid | Isophthalic Acid | Tetrachloro-Phthalic Anhydride | Sebacic Acid | Azaleic Acid | Propylene Glycol | 1,6-Hexanediol |
|---|---|---|---|---|---|---|---|---|
| 17 | .50 |  | .335 | .165 |  |  | .53 | .53 |
| 18 | .533 |  | .335 | .132 |  |  | .50 | .56 |
| 19 | .433 | .100 | .335 | .132 |  |  | .50 | .56 |
| 20 | .500 |  | .368 | .132 |  |  | .50 | .56 |
| 21 | .500 |  | .368 | .132 |  |  | .53 | .53 |
| 22 |  | .533 | .335 | .132 |  |  | .50 | .56 |
| 23 | .533 |  | .335 | .132 |  |  | .50 | .56 |
| 24 |  | .434 | .434 | .132 |  |  | .60 | .46 |
| 25 | .333 | .200 | .335 | .132 |  |  | .50 | .56 |
| 26 | .533 |  |  | .132 |  | .335 | .50 | .56 |
| 27 | .508 |  |  | .132 | .05 | .310 | .60 | .46 |
| 28 | .578 |  | .290 | .132 |  |  | .50 | .56 |

The polyesters are mixed with styrene monomer to provide a solution of 62–64 weight percent of the polyester in the solution as in Example I, and are cured and tested in accordance with the procedures and ASTM test methods set forth in Example I to provide cured resins with the following properties.

| Run No. | Flexural Strength (×10³ psi) | Flexural Modulus (×10⁵ psi) | Tensile Strength (×10³ psi) | Tensile Modulus (×10⁵ psi) | Tensile Elongation (%) | Heat Deflection Temp (° C) | Barcol Hardness |
|---|---|---|---|---|---|---|---|
| 17 | 18.9 | 4.78 | 11.49 | 4.73 | 4.34 | 71 | 41 – 42 |
| 18 | 18.6 | 4.67 | 11.70 | 4.66 | 5.44 | 72 | 39 – 40 |
| 19 | 17.9 | 4.59 | 10.84 | 4.54 | 5.02 | 73 | 41 – 42 |
| 20 | 17.2 | 4.50 | 10.07 | 4.53 | 6.89 | 66 | 41 – 42 |
| 21 | 17.7 | 4.63 | 10.67 | 4.69 | 5.37 | 68 | 41 – 42 |
| 22 | 18.8 | 4.69 | 11.80 | 4.64 | 4.03 | 73 | 41 – 42 |
| 23 | 17.2 | 4.52 | 11.08 | 4.69 | 5.52 | 68 | 37 – 38 |
| 24 | 19.7 | 4.94 | 11.45 | 4.89 | 4.27 | 71 | 41 – 42 |
| 25 | 17.5 | 4.57 | 11.20 | 4.79 | 4.39 | 74 | 40 – 41 |
| 26 | 18.1 | 4.56 | 10.74 | 4.53 | 4.93 | 79 | 40 – 41 |
| 27 | 16.4 | 4.33 | 10.47 | 4.43 | 4.35 | 70 | 39 – 40 |
| 28 | 17.1 | 4.43 | 10.32 | 4.73 | 4.93 | 75 | 32 – 33 |

While these resins have sufficiently high tensile elongations, other properties, particularly the heat deflection temperature, flexural strength and/or the modulus values are too low.

EXAMPLE V

A series of unsaturated polyesters is prepared to study the properties of unsaturated polyester compositions containing various combinations of different acid components, and containing the relatively short-chain propylene glycol as the alcohol component.

The resins, prepared as in Example I, have the following composition:

| Run No. | Maleic Anhydride | Fumaric Acid | Isophthalic Acid | Tetrachloro-Phthalic Anhydride | Adipic Acid | Propylene Glycol |
|---|---|---|---|---|---|---|
| 29 | 0 | .375 | .375 | .12 | .13 | 1.06 |
| 30 | 0 | .375 | .375 | .12 | .10 | 1.06 |
| 31 | 0 | .38 | .300 | .12 | .20 | 1.06 |
| 32 | 0 | .375 | .375 | .12 | .13 | 1.06 |
| 33 | 0 | .45 | .180 | .12 | .25 | 1.08 |
| 34 | 0 | .45 | .230 | .12 | .20 | 1.08 |
| 35 | 0 | .45 | .280 | .12 | .15 | 1.08 |
| 36 | 0 | .45 | .230 | .12 | .20 | 1.08 |
| 37 | .45 | 0 | .230 | .12 | .20 | 1.08 |
| 38 | 0 | .45 | .230 | .12 | .20 | 1.10 |

The polyesters are mixed with styrene monomer to provide a solution of 62–64 weight percent of the polyester in the solution as in Example I, and are cured and tested in accordance with the procedures and ASTM test methods set forth in Example I to provide cured resins with the following properties:

| Run No. | Flexural Strength (×10³ psi) | Flexural Modulus (×10⁵ psi) | Tensile Strength (×10³ psi) | Tensile Modulus (×10⁵ psi) | Tensile Elongation (%) | Heat Deflection Temp (° C) | Barcol Hardness |
|---|---|---|---|---|---|---|---|
| 29 | 21.4 | 5.65 | 11.61 | 5.70 | 2.74 | 85 | 47 – 48 |
| 30 | 21.0 | 5.62 | 11.20 | 5.83 | 2.52 | 90 | 48 – 49 |
| 31 | 21.0 | 5.28 | 11.63 | 5.2 | 3.03 | 84.5 | 44 – 45 |
| 32 | 20.9 | 5.24 | 12.26 | 5.12 | 4.20 | 82.5 | 41 – 42 |
| 33 | 19.6 | 5.10 | 11.44 | 5.19 | 3.61 | 89 | 40 – 41 |
| 34 | 20.8 | 5.34 | 12.55 | 5.35 | 3.80 | 95 | 42 – 43 |
| 35 | 21.7 | 5.53 | 11.05 | 5.79 | 2.54 | 100 | 45 – 46 |
| 36 | 19.6 | 5.24 | 11.47 | 5.32 | 3.19 | 90 | 43 – 44 |
| 37 | 19.8 | 5.45 | 8.94 | 5.46 | 1.99 | 83.5 | 40 – 41 |
| 38 | 19.7 | 5.29 | 11.43 | 5.54 | 3.35 | 89 | 43 – 44 |

With the exception of run No. 37, which has a maleic acid component instead of a fumaric acid component, these runs illustrate properties of cured resins incorporating different proportions of fumaric acid, isophthalic acid, tetrachlorophthalic anhydride and adipic acid. Run No. 34 demonstrates a composition having excellent physical properties exceeding the cured resin specifications of the present invention.

In accordance with the present invention, an unsaturated polyester polymer is provided which may be cured with styrene to produce a crosslinked resin having a combination of physical properties which is desirable for use in connection with filament wound composites. While the invention has been particularly described with respect to certain specific embodiments, it should be appreciated that various modifications and adaptations will become apparent to those skilled in the art in view of the present disclosure. In this regard, for example, it is possible that very minor amounts of materials other than the specified components may be included in the polyester polymers while retaining benefits of the invention. Furtheremore, while the unsaturated polyesters find particular utility when cured with styrene, the unsaturated polyester polymers may also be used with vinyl or allyl monomers other than styrene, or mixtures of such monomers and styrene. Such modifications and adaptations are intended to be included in the scope of the appended claims.

Various of the features of the invention are set forth in the following claims.

What is claimed is:

1. An unsaturated polyester polymer for use in polyester resins, said polyester polymer consisting essentially of the ester condensation product of propylene glycol, an aliphatic acid component and an aromatic acid component, the molar ratio of said aromatic acid component to said aliphatic acid component being in the range of from about 35/65 to about 37/68, said aliphatic acid component consisting essentially of a mixture of adipic and fumaric acids in which the molar ratio of said adipic acid component to said fumaric acid component is in the range of from about 20/45 to about 20,48, and said aromatic component consisting essentially of a mixture of isophthalic acid and halogenated phthalic anhydride, the proportion of said halogenated phthalic anhydride component being selected to provide from about 5 to about 7 percent by weight of halogen in said polyester polymer, a solution of said polyester in styrene with a polyester to styrene weight ratio of from about 63/37 to about 65/35 being capable of being cured under addition polymerization conditions to provide a cured resin having a Barcol Hardness of at least 40, a heat deflection temperature of at least about 90° C., a flexural strength of at least 20,000 psi, a flexural modulus of at least $5.0 \times 10^5$ psi, a tensile strength of at least 10,000 psi, a tensile modulus of at least $5.0 \times 10^5$ psi, and a tensile elongation of at least 3.0 percent.

2. An unsaturated polyester polymer in accordance with claim 1 wherein said polyester polymer consists essentially of the ester condensation product of propylene glycol, fumaric acid, isophthalic acid, tetrachlorophthalic anhydride, and adipic acid, and wherein the molar ratio of said fumaric acid component to said propylene glycol component is from about 0.45/1.08 to about 0.45/1.12, the molar ratio of said isophthalic acid component to said propylene glycol component is from about 0.23/1.08 to about 0.23/1.12, the molar ratio of said tetrachlorophthalic anhydride component to said propylene glycol component is from about 0.12/1.08 to about 0.12/1.12 and the molar ratio of said adipic acid component to said propylene glycol component is from about 0.20/1.08 to about 0.20/1.12.

3. An unsaturated polyester polymer in accordance with claim 1 wherein said polymer consists essentially of the ester condensation product of propylene glycol, fumaric acid, isophthalic acid, tetrabromophthalic anhydride and adipic acid, and wherein the molar ratio of said fumaric acid component to said propylene glycol component is about 0.46/1.12, the molar ratio of said isophthalic acid component to said propylene glycol component is about 0.28/1.12, the molar ratio of said tetrabromophthalic anhydride component to said propylene glycol component is about 0.06/1.2, and the molar ratio of said adipic acid component to said propylene glycol component is about 0.20/1.12.

* * * * *